(12) United States Patent
Kim et al.

(10) Patent No.: US 6,493,310 B1
(45) Date of Patent: Dec. 10, 2002

(54) NOISE DAMPING DEVICE FOR ROTATING BODY AND DISK PLAYER

(75) Inventors: Seong-hoon Kim, Sungnam (KR); Soon-kyo Hong, Seoul (KR); Byeong-cheon Koh, Sungnam (KR); Sung-jin Lee, Kwangmyung (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/283,692

(22) Filed: Apr. 2, 1999

(30) Foreign Application Priority Data

| Apr. 3, 1998 | (KR) | 98-11894 |
| Apr. 13, 1998 | (KR) | 98-13152 |
| May 2, 1998 | (KR) | 98-15860 |

(51) Int. Cl.⁷ .............................................. G11B 23/03
(52) U.S. Cl. ...................................................... 369/263
(58) Field of Search .............................. 369/75.1, 75.2, 369/263; 360/97.02

(56) References Cited

U.S. PATENT DOCUMENTS 5,947,607 A * 9/1999 Lee ............................ 384/107
6,041,899 A * 3/2000 Takamatsu et al. ......... 188/290

FOREIGN PATENT DOCUMENTS

| JP | 54-154310 | 12/1979 |
| JP | 62-62495 | 3/1987 |
| JP | 64-48797 | 3/1989 |
| JP | 2-139781 | 5/1990 |
| JP | 02-260194 | * 10/1990 |
| JP | 3-242893 | 10/1991 |
| JP | 6-295576 | 10/1994 |
| JP | 9-69282 | 3/1997 |
| KR | 90-12619 | 7/1990 |

* cited by examiner

Primary Examiner—George J. Letscher
(74) Attorney, Agent, or Firm—Sughrue Mion, PLLC

(57) ABSTRACT

A noise damping device for a rotating body and a disk player is disclosed. The noise damping device for a rotating body is characterized in that inner surfaces of a housing in which the rotating body is installed are provided with an intaglio and/or cameo pattern of a predetermined shape. The pattern guides the air flow within the housing smoothly, and damps noise. Also, the noise damping device for a disk player is characterized in that an intaglio and/or cameo pattern of a predetermined shape is formed on surfaces of a disk tray and/or a clamping member.

3 Claims, 24 Drawing Sheets

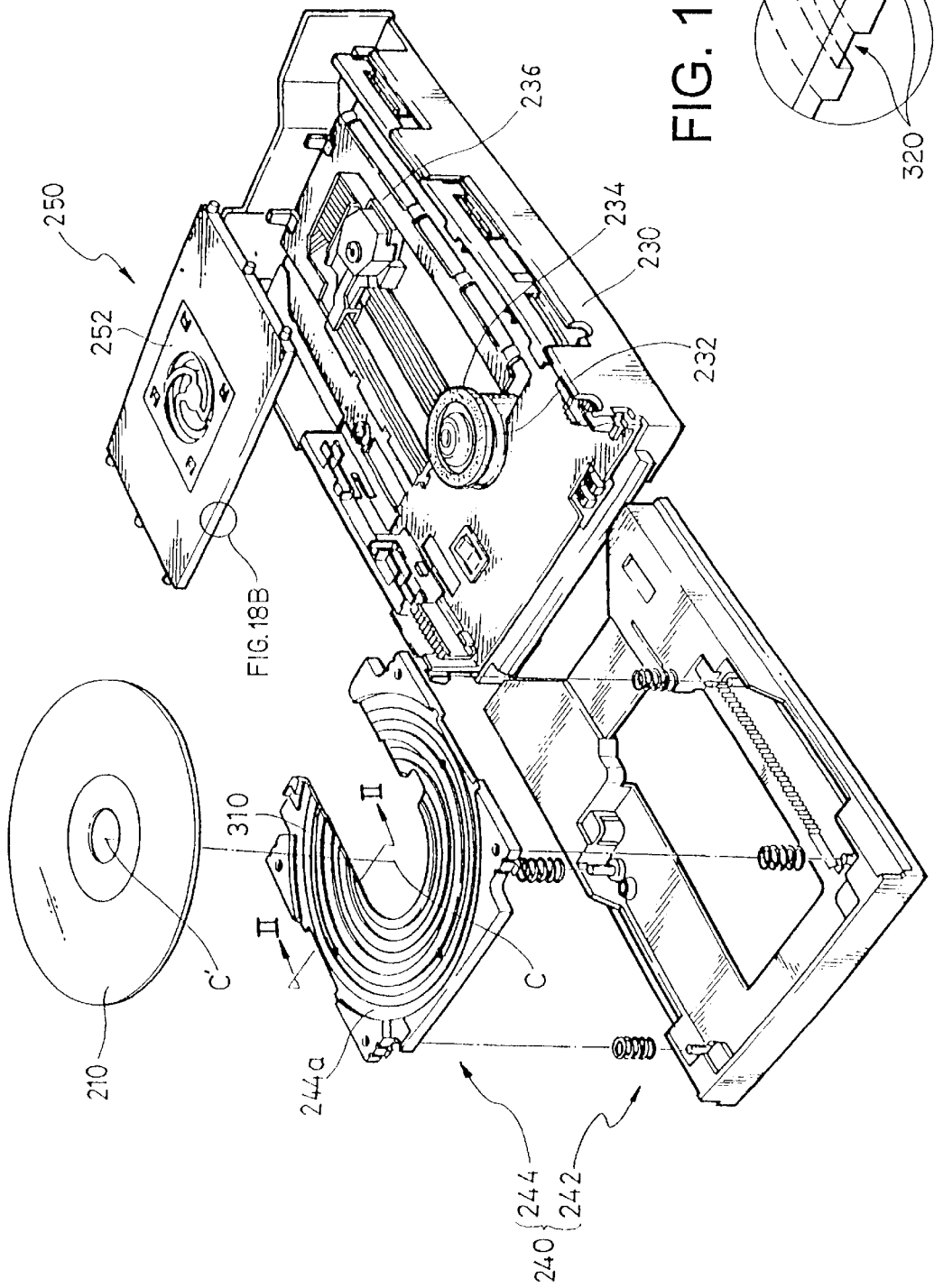
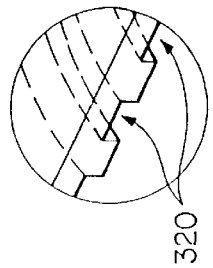
FIG. 18A
FIG. 18B

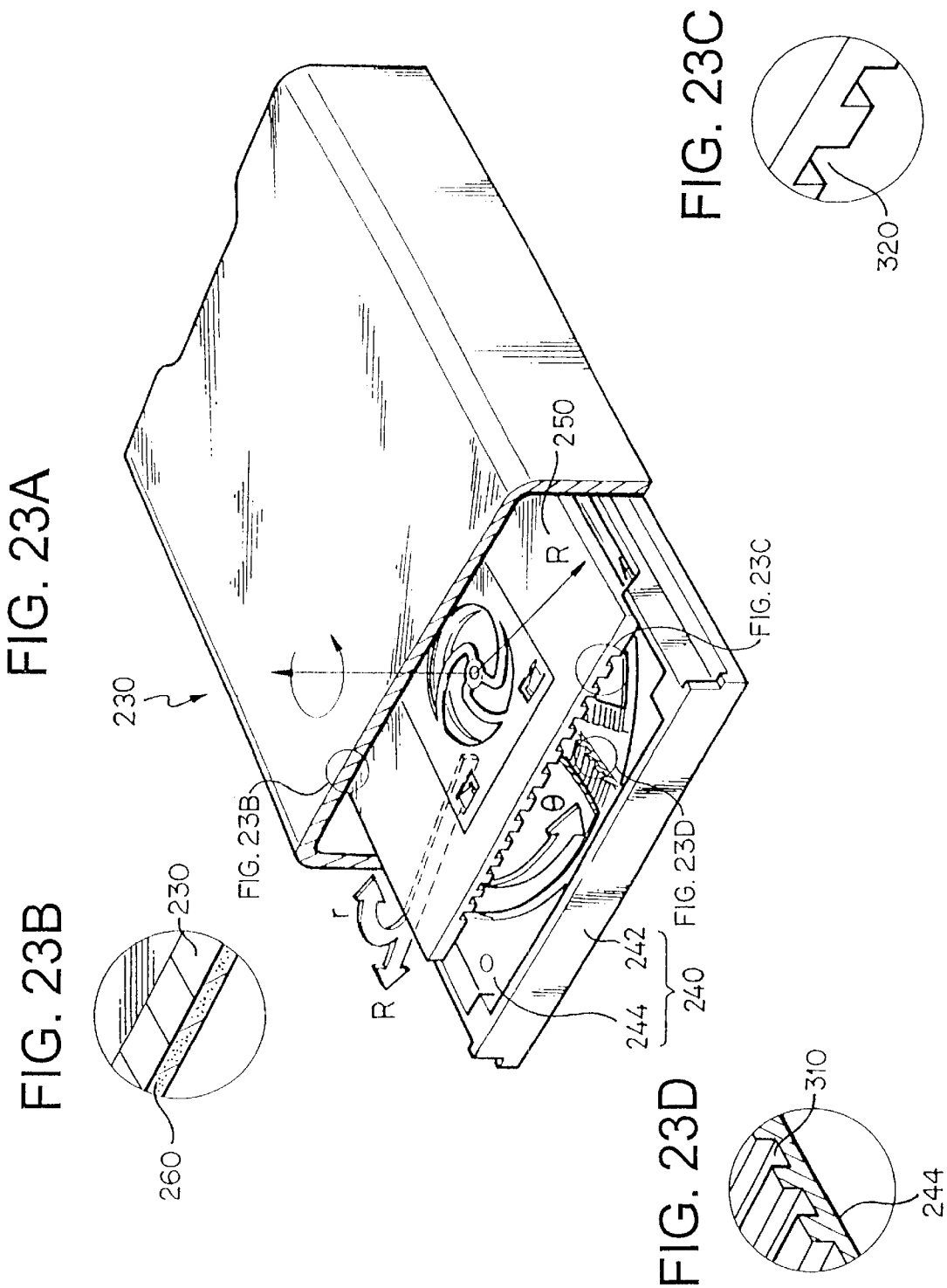

NOISE DAMPING DEVICE FOR ROTATING BODY AND DISK PLAYER

BACKGROUND OF THE INVENTION

1. Field of the Invention

The present invention relates to a noise damping device for a rotating body and a disk player, and more particularly, to a noise damping device which has an improved structure so as to dampen noise generated by the flow of ambient air when a rotating body or a disk, disposed in a housing, rotates.

2. Description of the Related Art

In general, in a disk player such as a DVD player, a CD-ROM player, or a hard disk drive, a rotating body such as a hard disk or a compact disk is placed in a housing thereof. While rotating at high speed, such a rotating body generates noise due to fluctuation in the air surrounding the rotating body. Therefore, in the above apparatus, a noise dampening device for damping rotation noise of the rotating body is provided.

FIG. 1 is a partially cut away perspective view schematically illustrating a hard disk drive used as an auxiliary memory device of a computer.

Referring to FIG. 1, a hard disk drive is provided with a housing 10, a hard disk 18 installed in the housing 10 and a noise damping device.

The housing 10 is installed in a computer main body (not shown), and comprises a base frame 12 supporting hard disks 18 and a cover frame 14 attached on the base frame 12 for protecting the hard disks 18.

While the hard disks 18 are rotated by a driving source such as a spindle motor installed in the housing 10, data are written to the hard disks 18 or written data are read from the hard disks 18 by a predetermined data writing/reading means (not shown). In addition, there are several hard disks 18 for increased storage capacity.

The noise damping device is attached to the outer surface of the cover frame 14 by an adhesive such as a bond or a double-sided bonding tape, and comprises a damper member 16 usually manufactured in a thin plate structure using stainless steel. The damper member 16 is specifically designed to mainly damp noise in a predetermined frequency range considering the rotation speed of the hard disks 18. For example, when the hard disks 18 rotate at a rotation speed of about 12 m/s, the damper member 16 is designed to mainly damp noise in the range of around 1,500 Hz corresponding to the rotation speed.

In the hard disk drive having the above structure, when the hard disks 18 are rotated by the spindle motor so as to write data to or read written data from the hard disks 18, as shown in FIG. 2, most of the air within the housing 10 tends to flow in θ and R directions. Here, the air flowing in θ direction is distributed at irregular pressures with respect to R directions, and the air in itself flows irregularly. When the irregular air flow impacts the inner walls of the housing 10, the housing 10 is vibrated by the impact, and consequently, undesirable noise is generated. Further, when the air flowing in the R directions reaches the inner walls of the housing 10, the air flow direction is changed to an r direction and the air is mixed with the air flowing in the θ direction. Therefore, the air flow in the θ direction becomes more irregular, and consequently, the noise is increased. Such noise is damped to some extent by the damper member 16 absorbing the vibration of the housing 10.

However, in the above conventional art, since the damper member 16 for damping noise must be separately attached to the outer surface of the housing 10, there are problems in that the manufacturing cost is high and more assembling operations are required. In addition, when the temperature within a computer main body and/or the housing 10 rises, the bonding force of the adhesive deteriorates due to the heat generated in the computer main body. Further, the damper member 16 can only control a predetermined frequency band. Thus, noise with various frequency bands, when the rotation speed of the hard disks 18 varies, cannot be effectively dampened.

SUMMARY OF THE INVENTION

The present invention provides a noise damping device for a rotating body capable of effectively dampening noise generated by the rotating body by modifying the structure of a housing.

Also, the present invention provides a noise damping device for a disk player capable of damping noise generated when a disk rotates by modifying the structure of parts installed in a housing.

Accordingly, to achieve the first objective, there is provided a noise damping device for a rotating body for dampening noise due to the air flow within a housing caused by the rotation of a rotating body, wherein an intaglio and/or cameo pattern of a predetermined shape is formed on inner surfaces of the housing.

Here, it is preferable that the housing includes a base on which the rotating body is placed, and a cover frame assembled to the base for covering the rotating body, and the pattern is formed on the upper surface of the base and the inner surface of the cover frame facing the rotating body.

In addition, it is preferable that the pattern is formed on the inner side surfaces of the housing.

In addition, it is preferable that the pattern has a starting point on the rotation axis of the rotating body, and is composed of a plurality of coaxial circles each having a predetermined width, the distances between neighboring circles are the same, and the coaxial circles have respective widths different from each other.

In addition, it is preferable that the pattern has a starting point on the rotation axis of the rotating body, is composed of a spiral having a predetermined width and is capable of guiding the air flow in radial directions from the starting point.

In addition, it is preferable that the pattern has a starting point on the rotation axis of the rotating body, is composed of radially disposed elements each having a predetermined width and is capable of guiding the air flow in radial directions from the starting point, and each of the radially disposed elements has a curved form.

In addition, it is preferable that the pattern is composed of a plurality of circles having a predetermined width and respective radii different from each other. The circles which touch neighboring circles guide the air flow guided by an inner circle toward an outer circle with respect to the rotation axis of the rotating body.

In addition, it is preferable that the pattern is composed of a plurality of dimples having a predetermined width and depth.

In addition, it is preferable that the device includes a vibration absorbing damper member installed on the outer surface of the housing.

To achieve the second objective, there is provided a noise damping device for a disk player for dampening noise due to the air flow within a housing caused by the rotation of a disk, wherein the device includes a disk tray which is movably installed to carry the disk into or out of the housing and is provided with a cameo and/or intaglio pattern of a predetermined shape formed on the surface of the disk tray facing the disk.

Here, it is preferable that the device further includes a clamping member which is installed within the housing for clamping the disk and is provided with a cameo and/or intaglio pattern of a predetermined shape formed on the surface of the clamping member facing the disk.

In addition, it is preferable that the device includes a noise absorbing member installed at the housing.

BRIEF DESCRIPTION OF THE DRAWINGS

The above objectives and advantages of the present invention will become more apparent by describing in detail a preferred embodiment thereof with reference to the attached drawings in which:

FIGS. 4A through 8 are plan views illustrating other embodiments of the pattern shown in FIG. 3;

FIG. 18 is an exploded perspective view schematically illustrating a disk player employing a noise damping device according to a preferred embodiment of the present invention;

FIG. 23 is a perspective view illustrating the operation of the noise damping device for a disk player shown in FIG. 18.

DESCRIPTION OF THE PREFERRED EMBODIMENTS

Figure 3A:
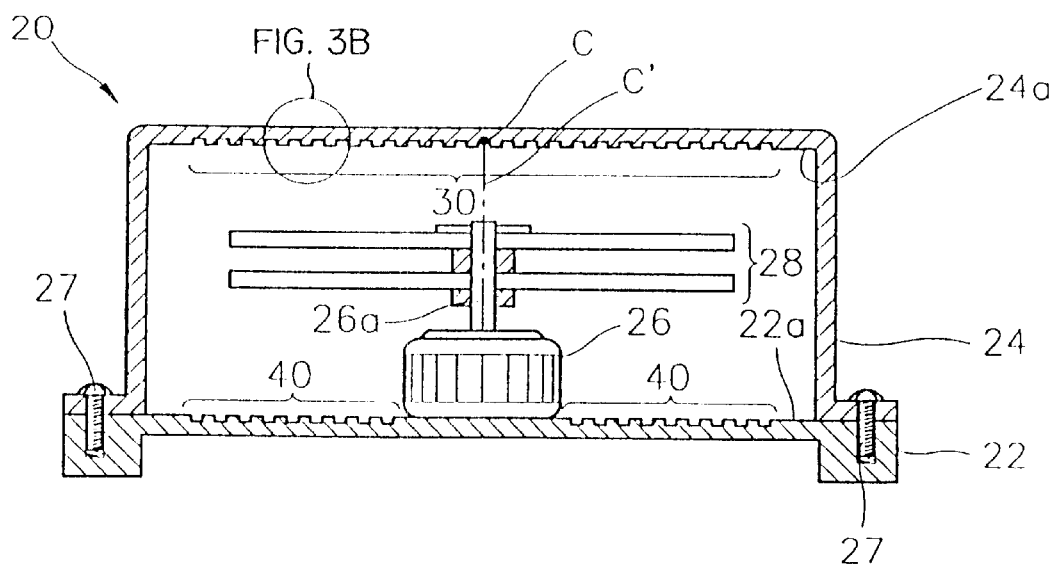
FIG. 3 is a schematic section view illustrating a noise damping device for a rotating body according to a preferred embodiment of the present invention.
Figure 3B:
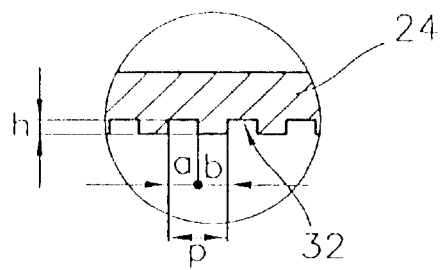

Referring to FIG. 3, a noise damping device for a rotating body according to a preferred embodiment of the present invention is intended to dampen undesirable noise by forming predetermined patterns 30 and 40 on the inner surfaces of a housing 20. Here, the noise is generated by a plurality of rotating bodies 28 rotated by a motor 26 as a driving force within the housing 20 of a disk player such as a hard disk driver, a DVD player or a CD-ROM player.

The housing 20 comprises a base 22 supporting the motor 26, and a cover frame 24 assembled to the base 22 by assembling means such as screws 27. The rotating bodies 28 are fixed to the rotating shaft 26a of the motor 26 to rotate. Here, the motor 26 may be installed outside the housing to rotate the rotating bodies 28.

The patterns 30 and 40 are formed on surfaces 22a and/or 24a of the base 22 and the cover frame 24, respectively, facing the rotating bodies 28.

Figure 4:
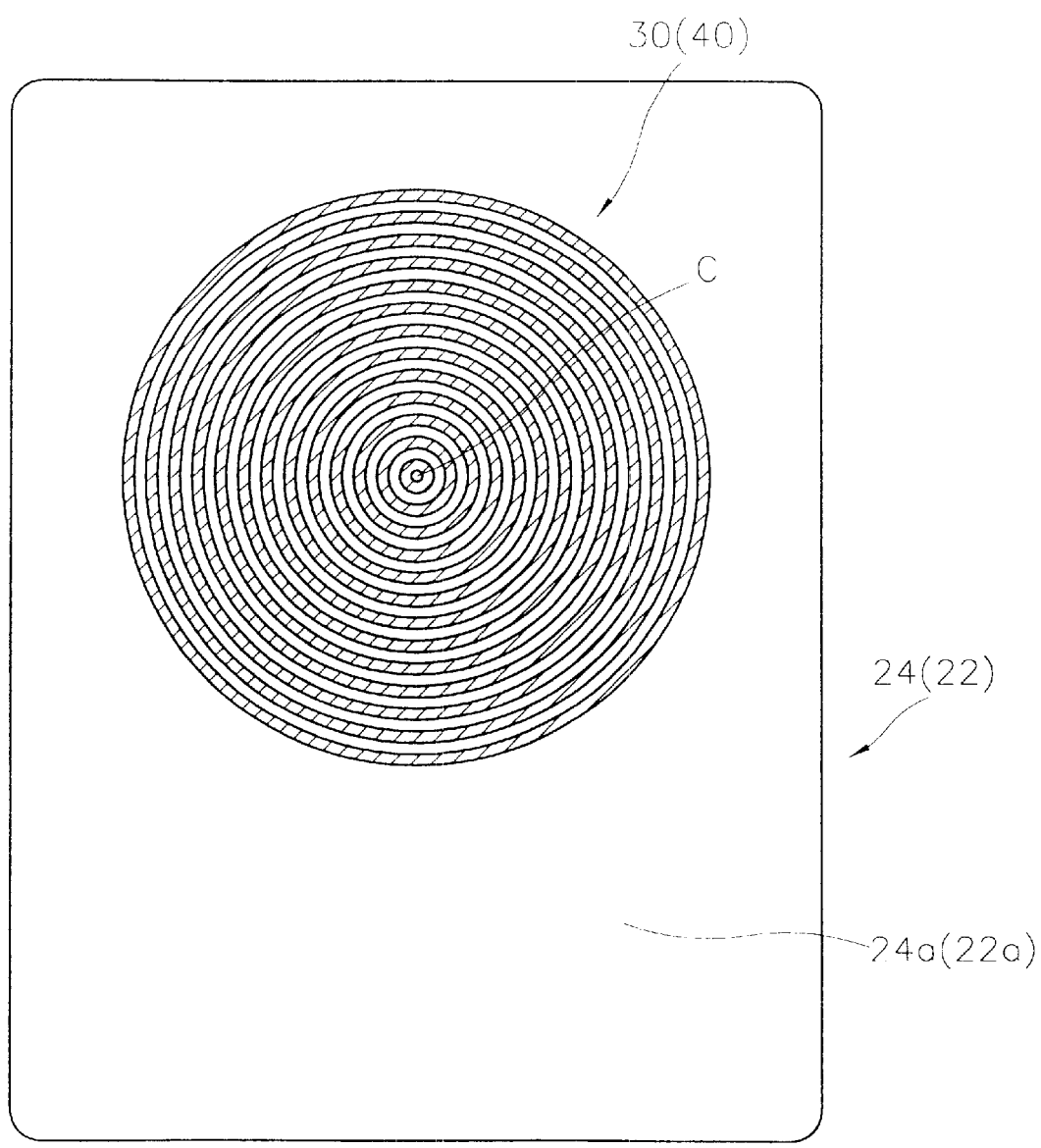
FIG. 4 is a schematic plan view illustrating a cover frame shown in FIG. 3.
Figure 4A:
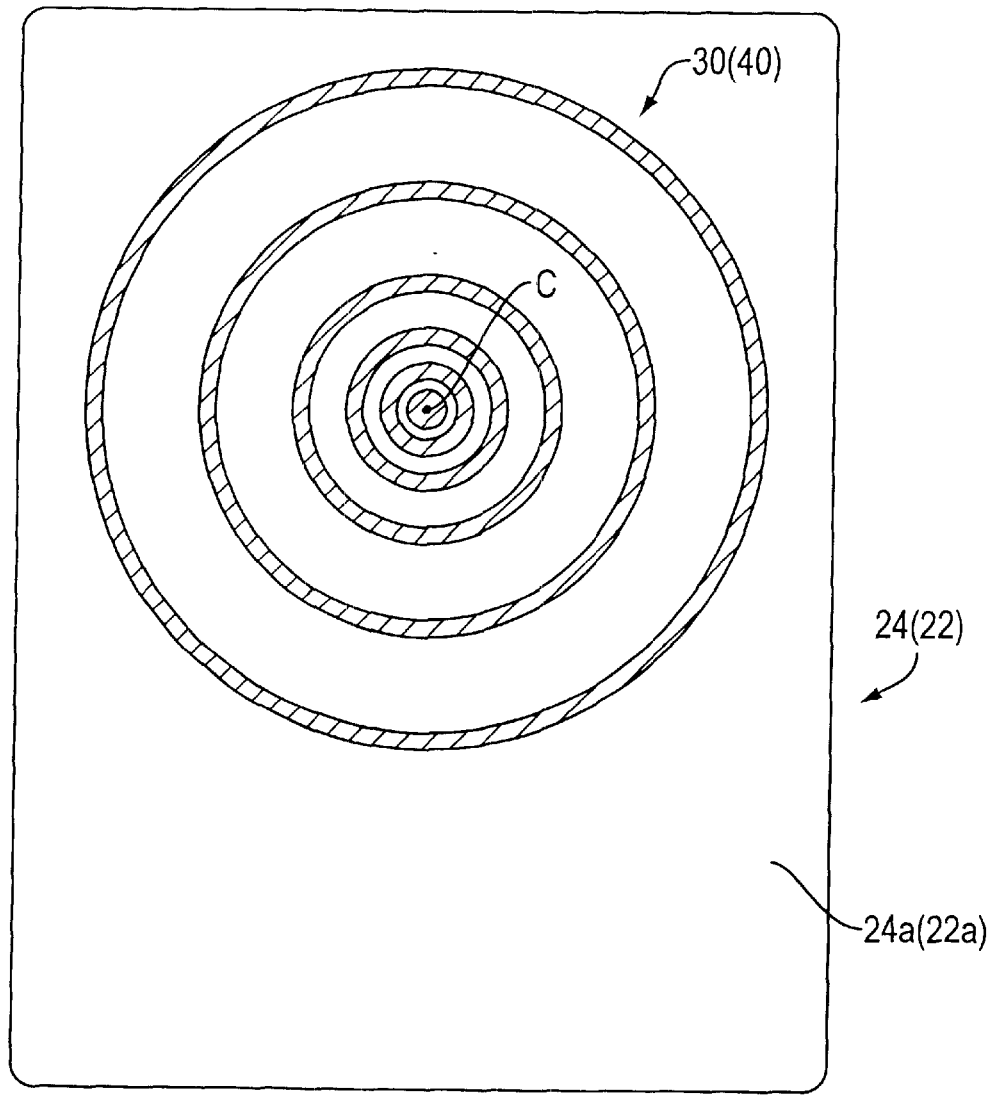
Figure 4B:
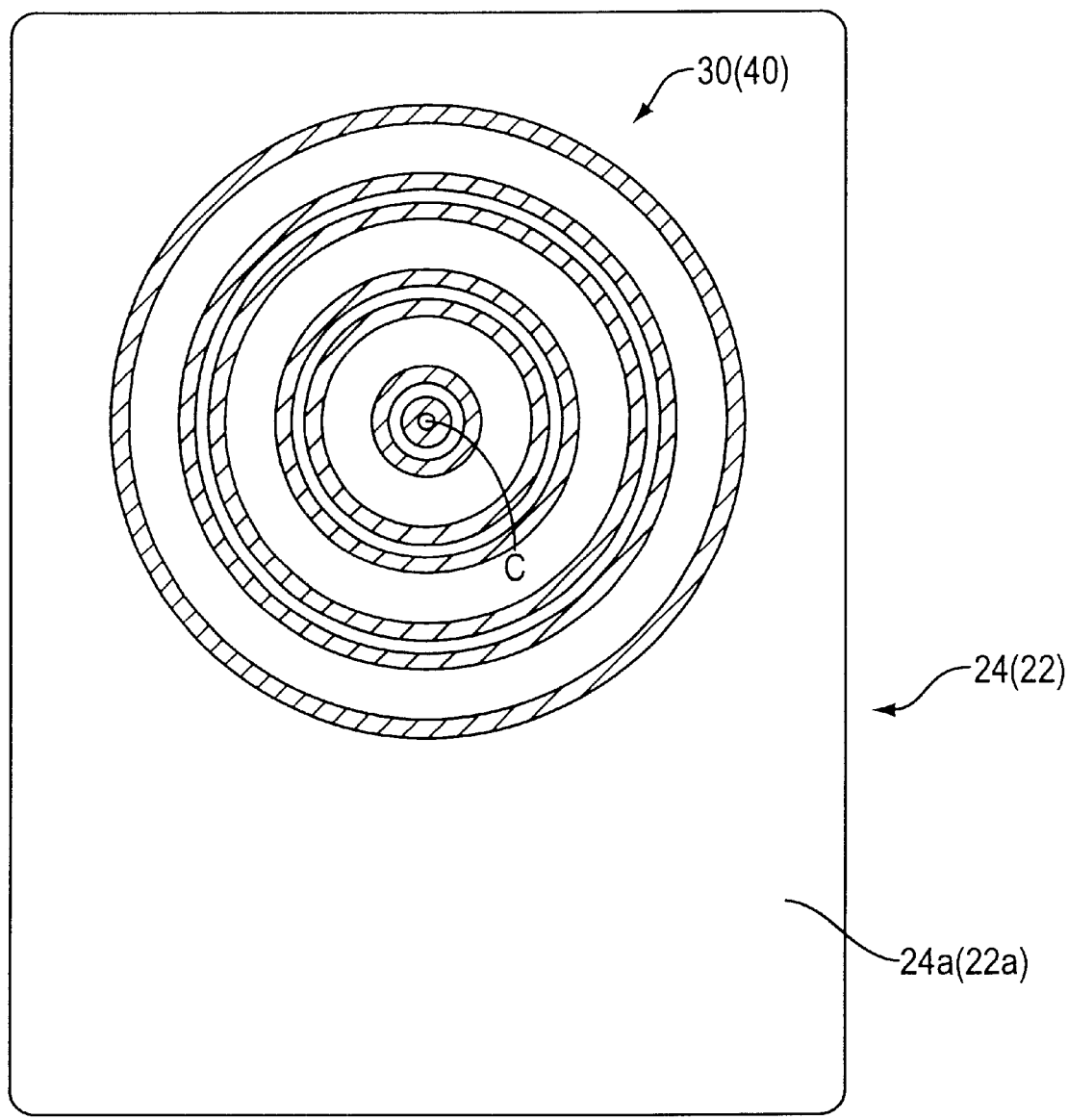

As shown in FIG. 4, the pattern 30 may be comprised of intaglio coaxial circles. The center C of coaxial circles is coaxial with the rotation axis of rotation C' of the rotating bodies 28. In addition, each coaxial circle pattern has the same width a, and a rectangular cross section, and neighboring circles are spaced apart a predetermined distance b. Here, it is preferable that the width a of the circles and the distance b between neighboring circles have the same value in order to effectively restrain the air flow within the housing. In addition, the distances b between neighboring circles may be formed to be different from each other. Pitches P which are the sum of the width a and the respective distances b may be irregular. On the other hand, the depth h of the coaxial circles is determined by considering the structure of the housing 20 and the rotation speed of the rotating bodies 28.

Such a pattern 30 can be formed by laser beam machining, NC machining, plating, die casting, pressing, or etching of the surface 24a of the cover frame 24.

The pattern 30 is not limited to an intaglio pattern with respect to the surface 24a of the cover frame 24, formed in a cameo pattern, and may be a combined intaglio and cameo pattern.

The pattern 40, formed on the surface 22a of the base 22, may be similarly comprised of a plurality of intaglio coaxial circles. Since such a pattern 40 is the same as the pattern 30 in shape, structure and processing method, a detailed description thereof will be omitted.

Referring to FIG. 3, the patterns 30 and 40 are formed on both the cover frame 24 and the base 22. However, this is just an example and the pattern 30 or 40 may be formed at either the cover frame 24 or the base 22.

Figure 5:
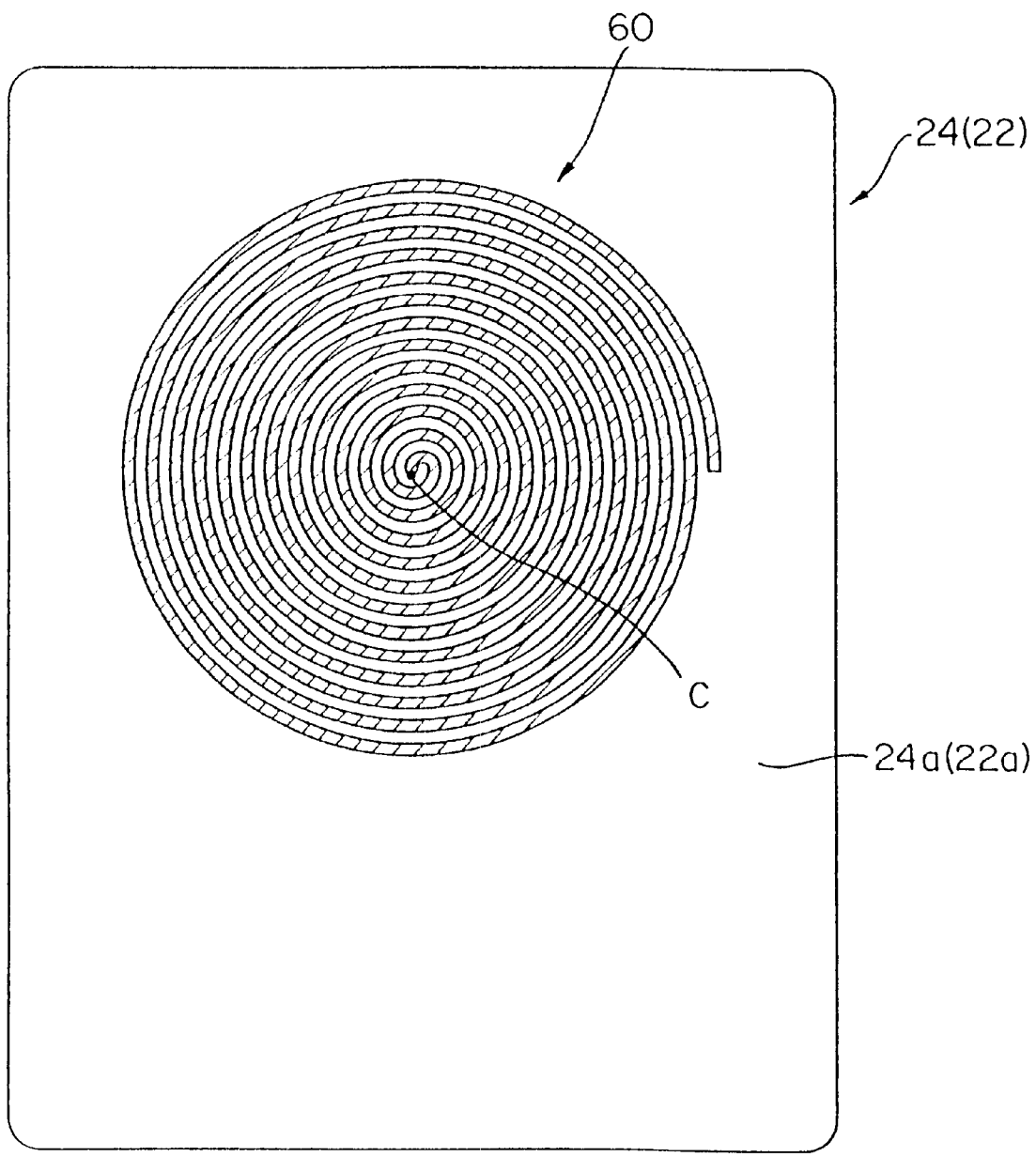

As shown in FIG. 5, the patterns 30 and 40 may be formed on the surface 24a of the cover frame 24 and/or the surface 22a of the base 22 in an intaglio spiral pattern 60. It is preferable that the starting point of a spiral pattern 60 is at the axis of rotation of the rotating bodies 28. In addition, the spiral pattern 60 is formed in a gradually increasing radius in a clockwise direction, but may also be formed in a counterclockwise direction.

Figure 6:
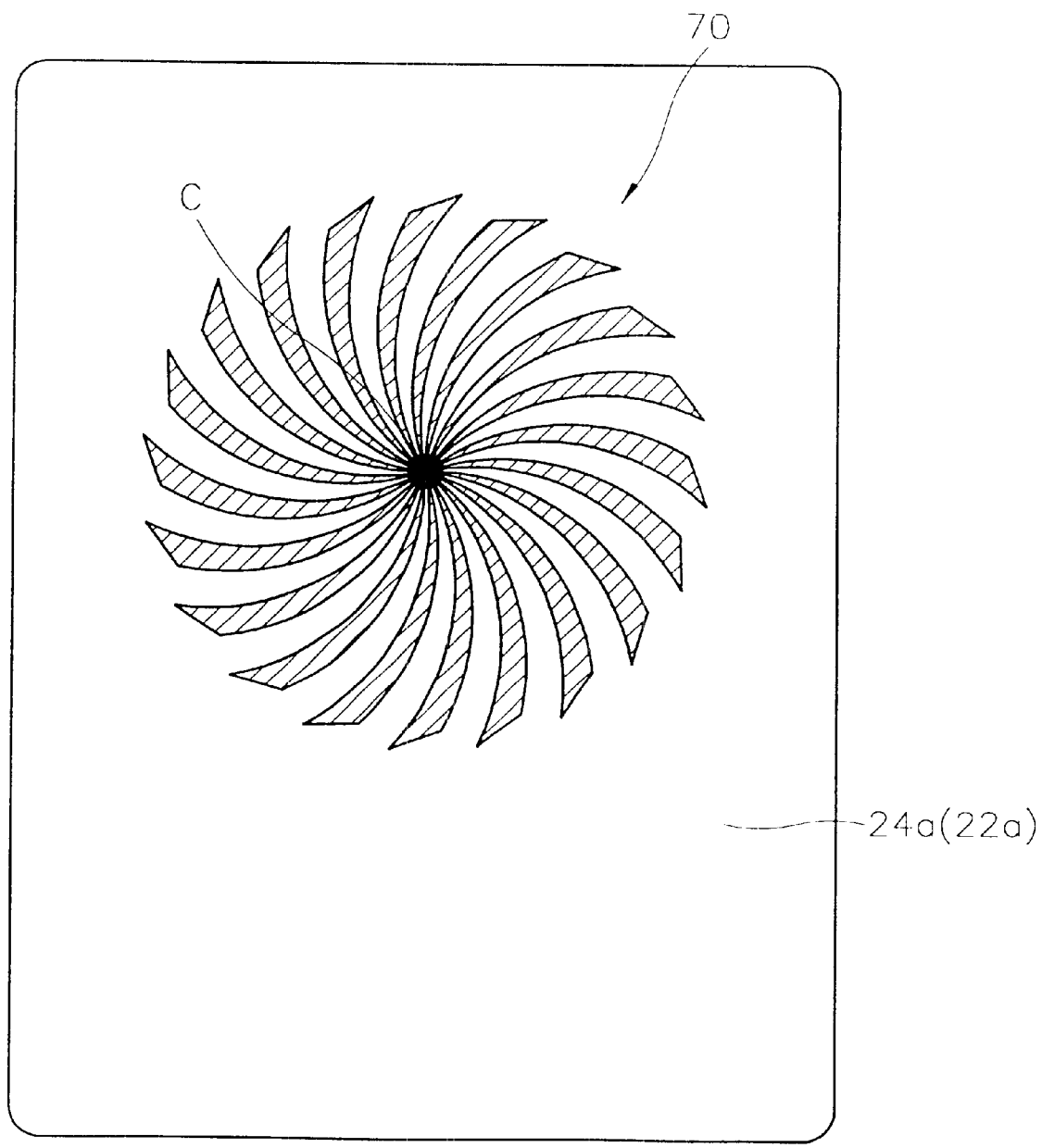

As shown in FIG. 6, the patterns 30 and 40 may be formed in an intaglio radial pattern 70. It is preferable that each element of the radial pattern 70 has a curved shape.

Figure 7:
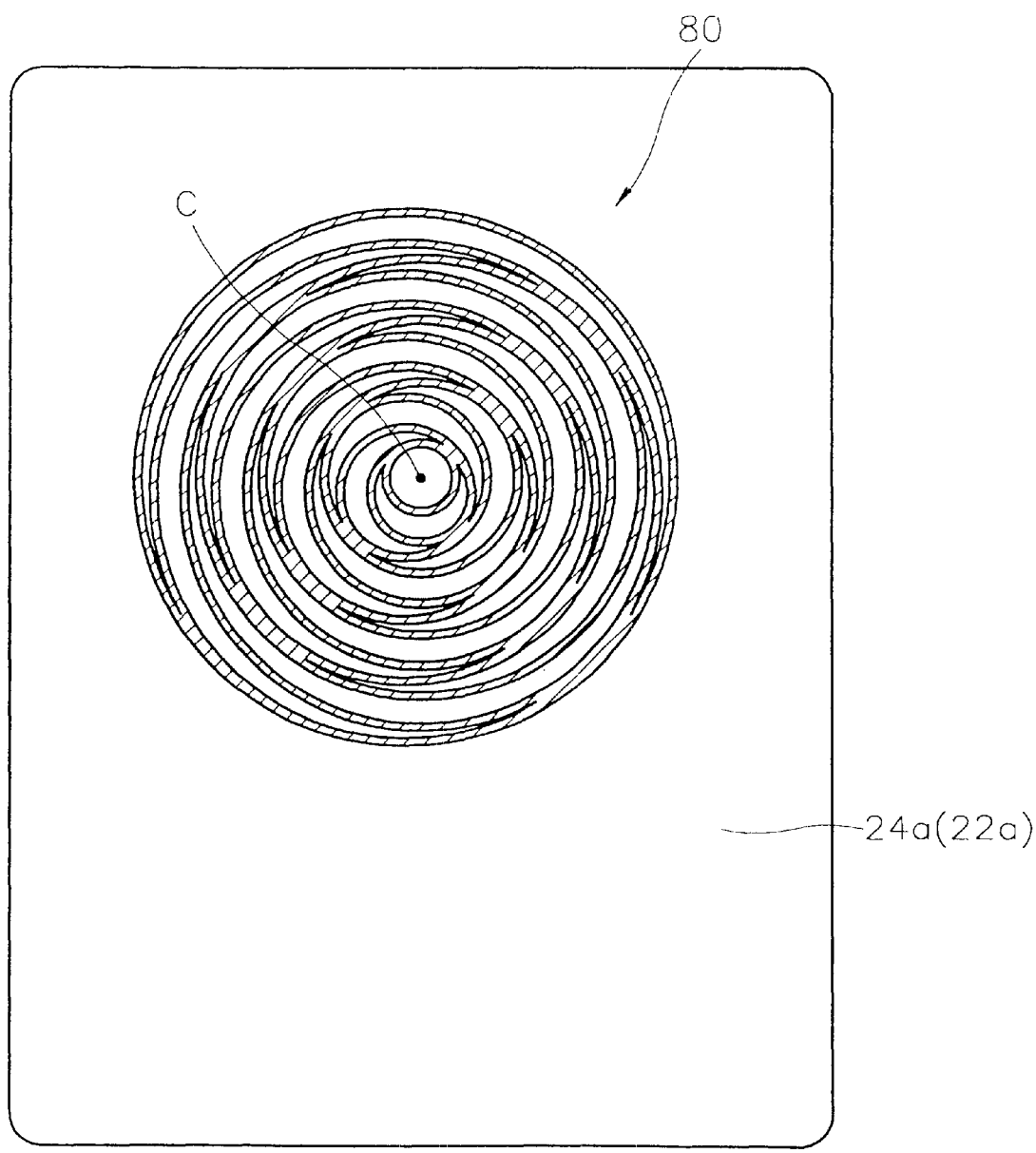

The patterns 30 and 40 may be a pattern 80 of a plurality of circles, as shown in FIG. 7. The circles of the pattern 80 have a predetermined width and radii different from each other. The circles of the pattern 80 each touching neighboring circles guide the air flow within the housing 20 from an inner circle to an outer circle. The pattern 80 has a center C of the innermost and outermost circles as a starting point, and it is preferable that the center C is coincident with the axis of rotation of the rotating bodies 28.

Figure 8:
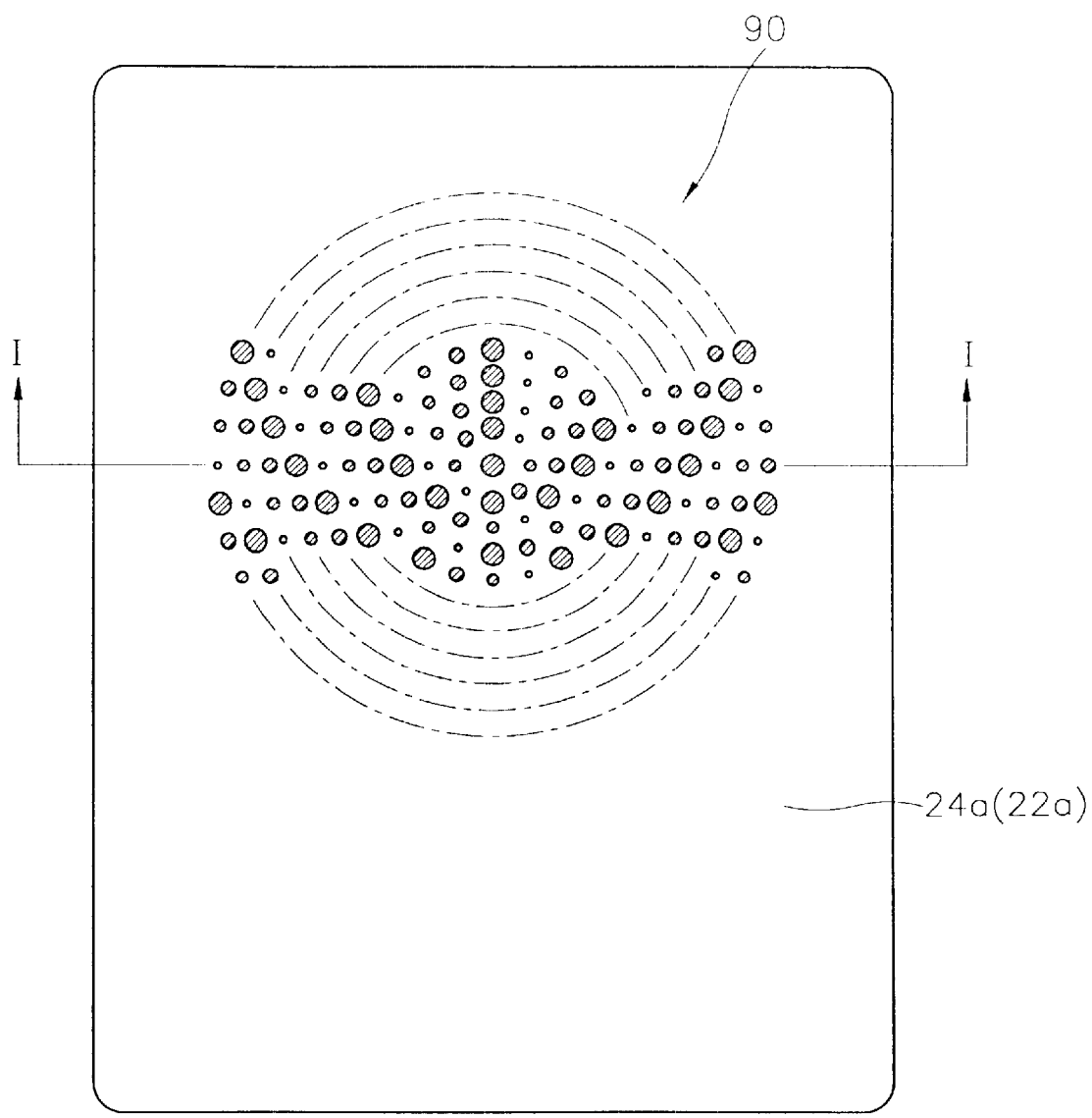
Figure 9A:
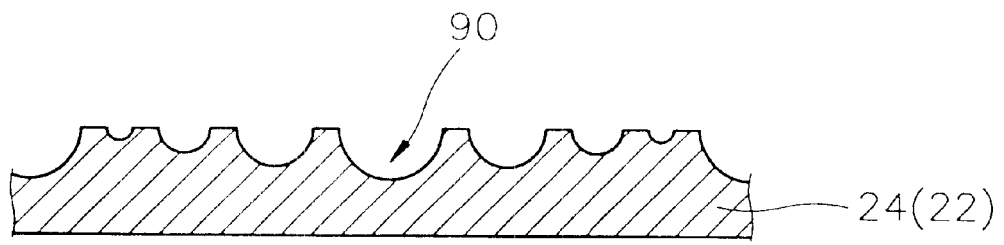
FIG. 9A is a section view taken along line I—I of FIG. 8.

In addition, as shown in FIGS. 8 and 9A, the pattern 30 and 40 may be a pattern 90 of a plurality of intaglio dimples. Here, the dimple pattern 90 is composed of various dimples with different depths and widths, for example, as on the surface of a golf ball, and the number and arrangement of the dimples can be decided by computer simulation considering the air flow. Each dimple may independently guide the air flow within the housing 20, or a group of dimples may control the air flow.

Figure 9B:
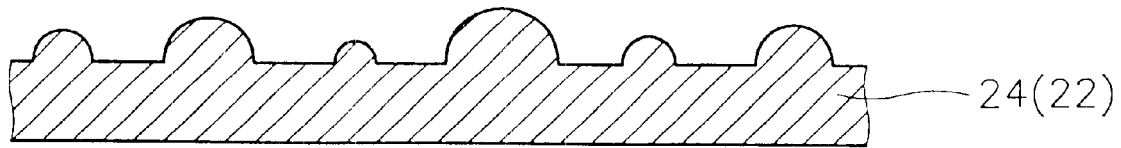
FIG. 9B is a section view illustrating another embodiment of the dimple pattern shown in FIG. 9A.

In addition, as shown in FIG. 9B, the pattern 30 and 40 may be a pattern of a plurality of cameo dimples.

FIGS. 10A through 10H shows various embodiments of cross sections of the above-mentioned patterns 30, 40, 60, 70, 80 and 90. Here, cross sections of each pattern are described assuming that each pattern is formed on the base 22, as an example, shown in FIG. 3 for the purpose of description.

Figure 10A:
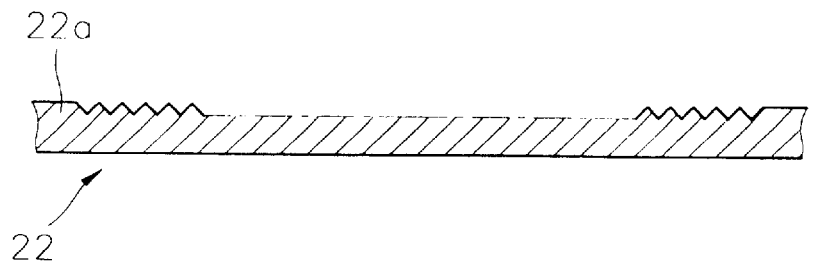
FIGS. 10A through 10H are section views illustrating other embodiments of the pattern shown in FIG. 3.

First, referring to FIG. 10A, a pattern of a plurality of first intaglio notches is formed on the surface 22a of the base 22. The first notches have a predetermined width, and the cross section of each notch is symmetrical to the center line of the width.

Figure 10B:
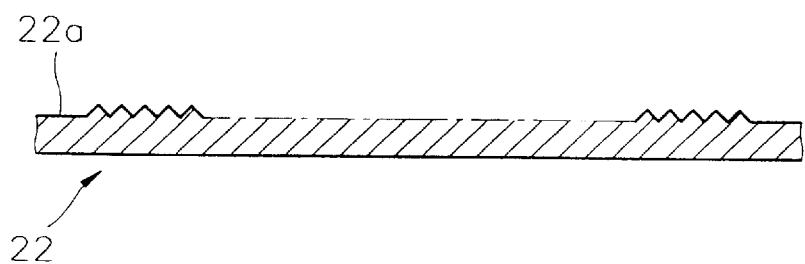

Referring to FIG. 10B, a pattern of a plurality of first cameo wedges is formed on the surface 22a of the base 22. As in the first notch pattern, the first wedges have a predetermined width, and the cross section of each wedge is symmetrical to the center line of the width.

Figure 10C:
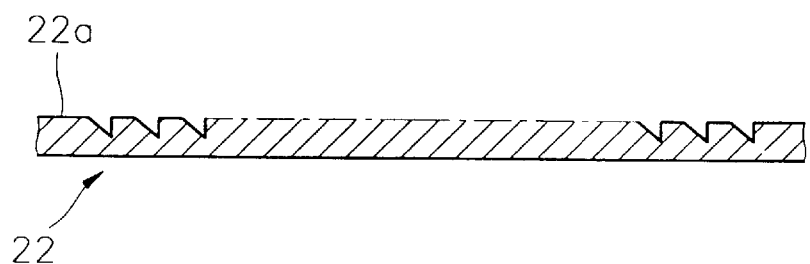

Referring to FIG. 10C, a pattern of a plurality of second intaglio notches is formed on the surface 22a of the base 22. The second notches have a predetermined width, and the cross section of each notch is asymmetrical to the center line of the width.

Figure 10D:
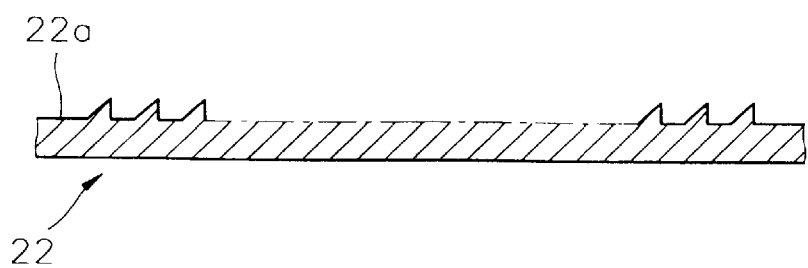

Referring to FIG. 10D, a pattern of a plurality of second cameo wedges is formed on the surface 22a of the base 22. As in the second notch patterns, the second wedges have a predetermined width, and the cross section of each wedge is asymmetrical to the center line of the width.

Figure 10E:
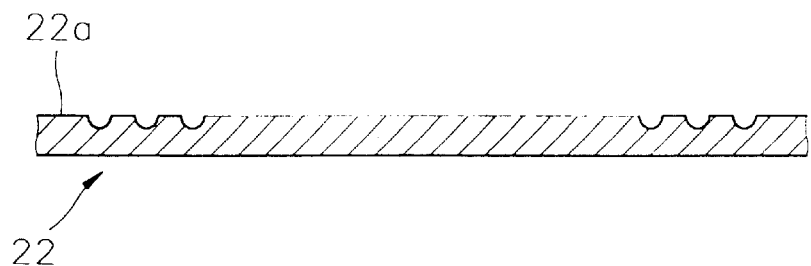

Referring to FIG. 10E, a pattern of a plurality of intaglio curved section shapes is formed on the surface 22a of the base 22. The curved section shapes have a predetermined width, and each cross section shape is symmetrical to the center line of the width.

Figure 10F:
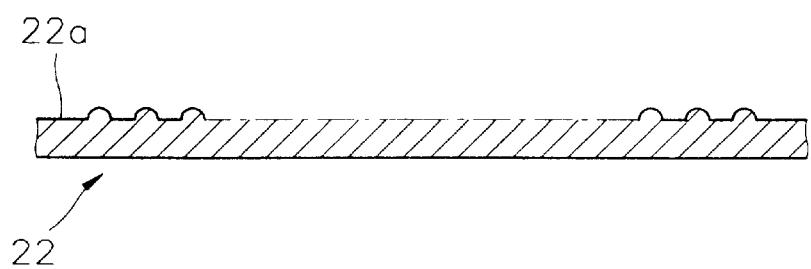

Referring to FIG. 10F, a pattern of a plurality of cameo curved section shapes is formed on the surface 22a of the base 22. The curved section shapes have a predetermined width, and the cross section shape is symmetrical to the center line of the width.

Figure 10G:
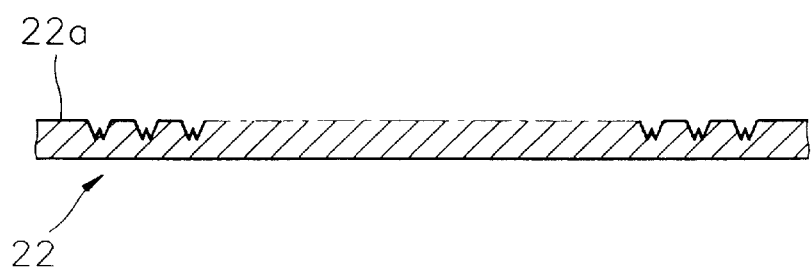

Referring to FIG. 10G, a pattern of a plurality of intaglio W shapes is formed on the surface 22a of the base 22. The intaglio W shapes have a predetermined width, and each cross section shape is symmetrical to the center line of the width.

Figure 10H:
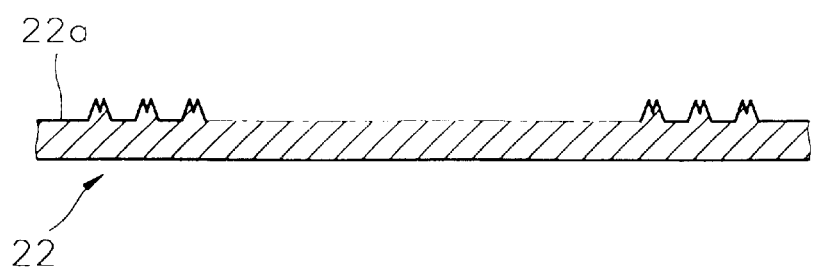
Figure 11:
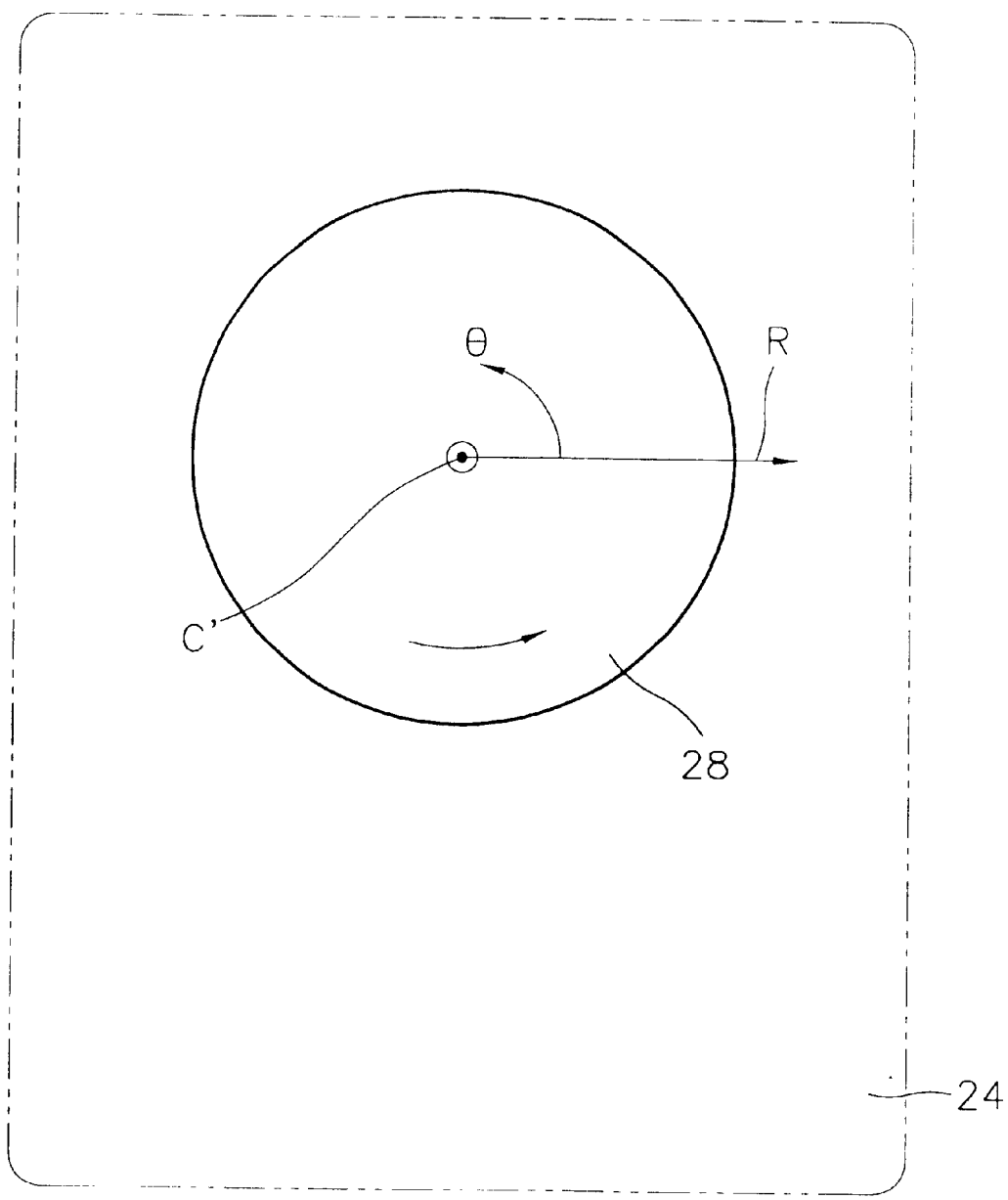
FIGS. 11 through 13 are a plan view and partially cut away perspective views for describing the operation of a noise damping device according to a preferred embodiment of the present invention.
Figure 12:
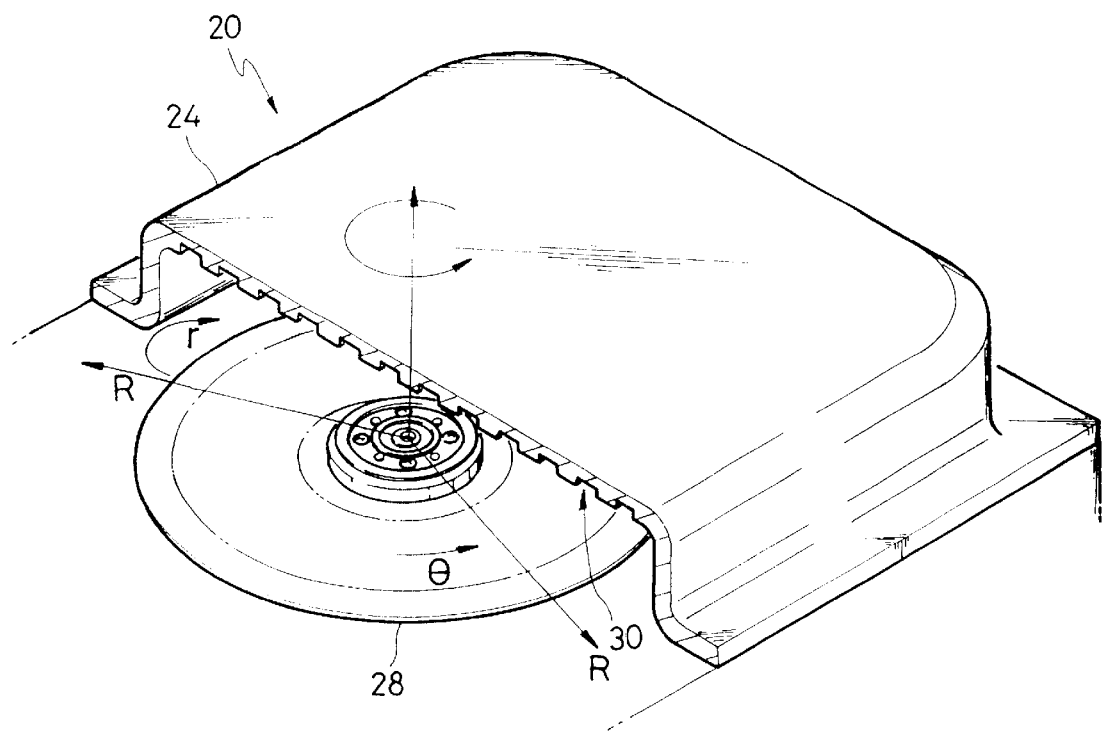

In addition, referring to FIG. 10H, a pattern of a plurality of cameo W shapes is formed on the surface 22a of the base 22. The cameo W shapes have a predetermined width, and each cross section shape is symmetrical to the center line of the width.

Here, only the section shapes of the patterns shown in FIGS. 10A through 10H are described, but it should be understood that various section shape patterns other than the described patterns are applicable. In addition, appropriately combined patterns may be employed.

Now, the operation of a noise damping device for rotating bodies according to a preferred embodiment of the present invention will be described with reference to FIG. 3 and FIGS. 11 through 13.

First, when the rotating bodies 28 is rotated by the motor 26 in the θ direction within the housing 20, air within the housing 20 flows in θ and R directions at a predetermined speed.

Figure 13:
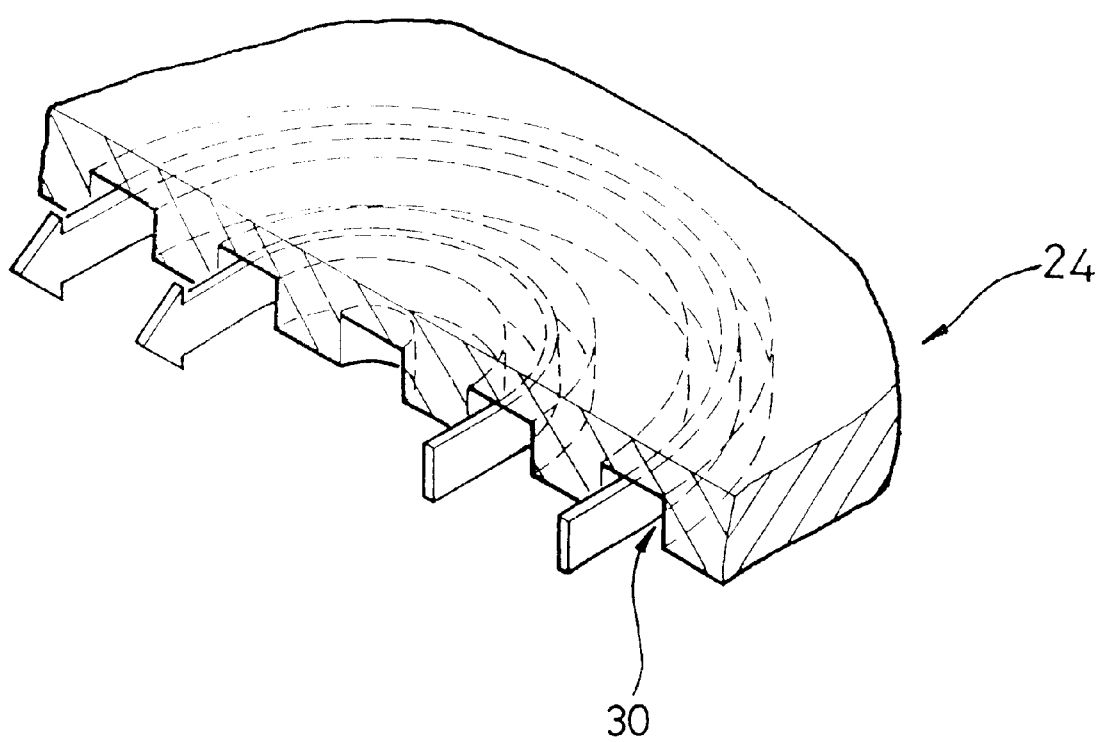

Since the air flowing in the θ direction is, as shown in FIG. 13, guided by the pattern 30 formed on the cover frame 24, the pressure distribution thereof is nearly uniform in the R directions while being different from the conventional art, and the air flow in the θ direction is more regular than the conventional art.

Thus, the air flow in the space between the cover frame 24 and the rotating bodies 28 becomes regular and smooth due to the pattern 30, the impact of air colliding against the cover frame 24 is reduced, and vibrations of the cover frame 24 are reduced to consequently reduce noise. In addition, the pattern 40 formed on the base 22 controls the air flow in the θ direction to be regular due to the same principle as of the pattern 30 formed at the cover frame 24.

Figure 14:
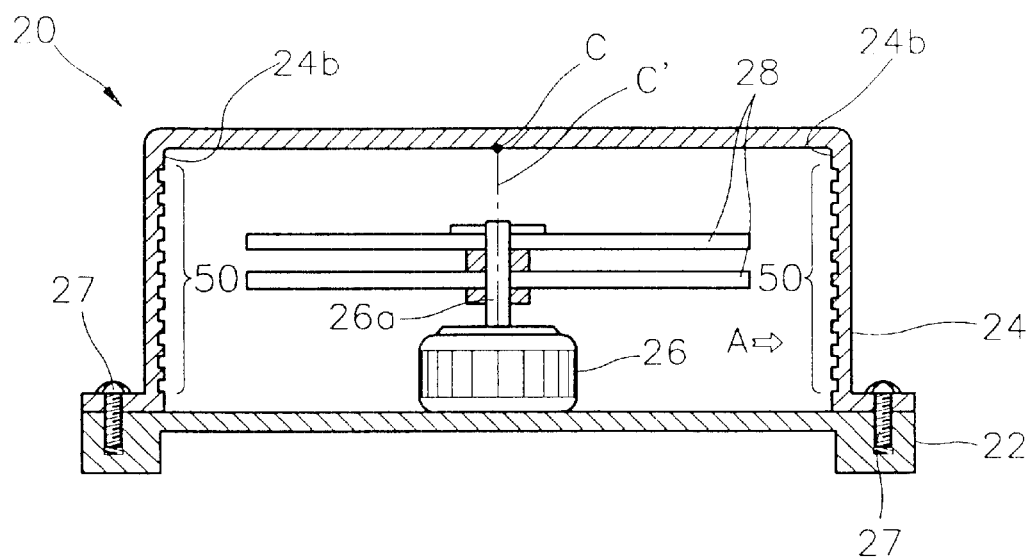
FIG. 14 is a schematic section view illustrating a noise damping device for a rotating body according to another embodiment of the present invention.
Figure 15:
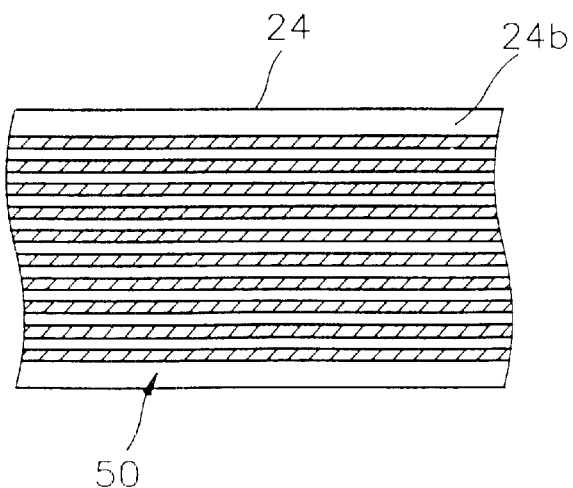
FIG. 15 is an inner side view of a cover frame shown in FIG. 14, shown from the perspective in the direction indicated by arrow A.

As shown in FIGS. 14 and 15, a noise damping device for a rotating body according to another embodiment of the present invention is formed on the inner side surface 24b of the cover frame 24 in a pattern 50 of an predetermined intaglio shape. The pattern 50 is formed in linear forms having a predetermined width and a rectangular section. While, in the above embodiment, only the pattern 50 is formed on the inner side surface 24b of the cover frame 24, it is possible for the patterns 30 and 40 to be formed together and to be formed in cameo shapes.

Figure 16:
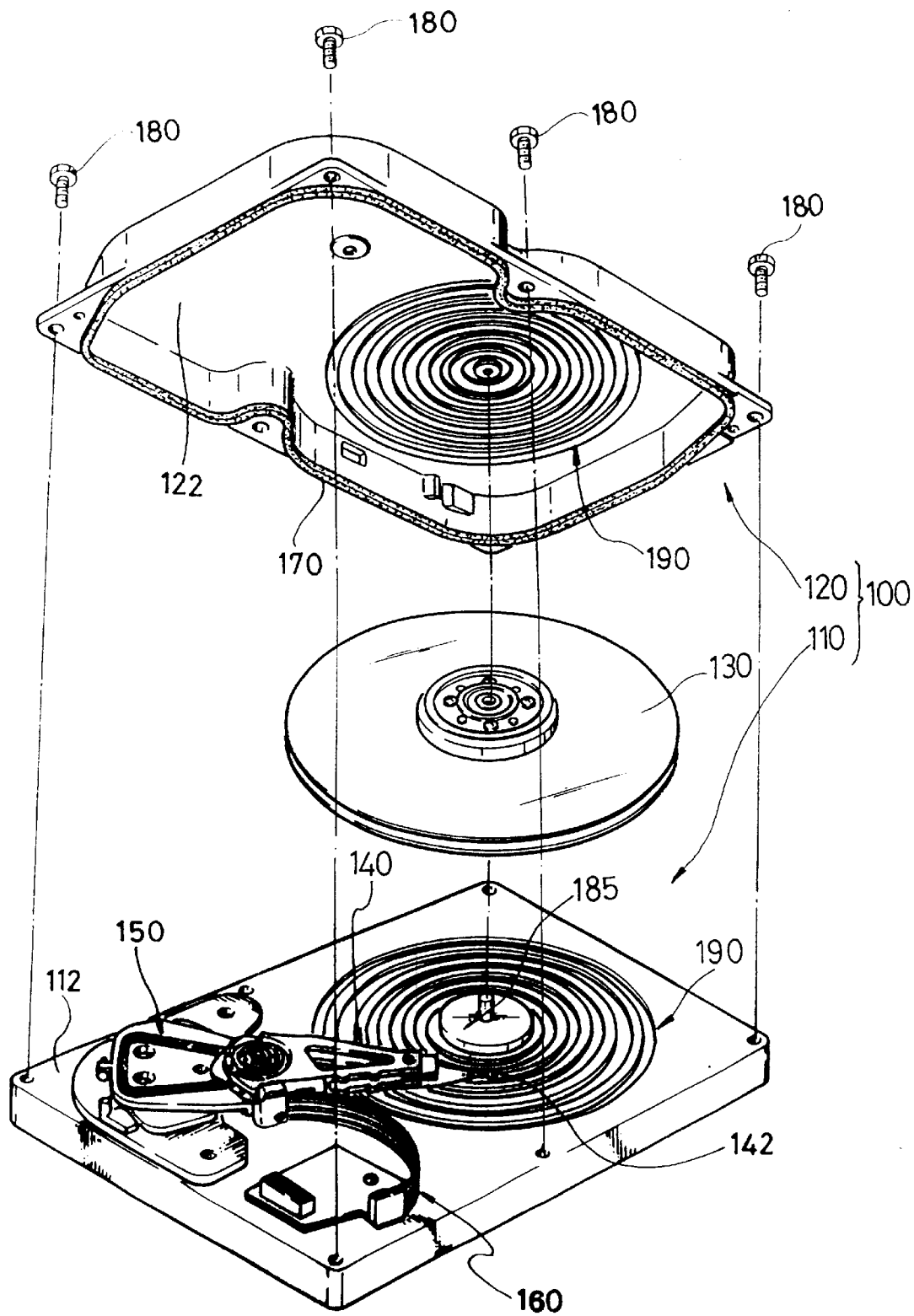
FIG. 16 is an exploded perspective view schematically illustrating a hard disk drive to which a noise damping device for a rotating body according to a preferred embodiment of the present invention is applied.

FIG. 16 shows a noise damping device for a rotating body applied to a hard disk drive according to the present invention. Referring to FIG. 16, the hard disk drive includes a housing 100, hard disks 130 for storing data, an actuator arm 140 supporting a head 142 for writing data to the hard disks 130 and reading written data from it, and a voice coil motor 150, and a noise damping device for a rotating body.

The housing 100 comprises a base 110 and a cover frame 120. The voice coil motor 150 and a circuit portion 160 are installed on the base 110. The voice coil motor 150 supplies a driving force for moving the head 142 in a radial direction of the hard disks 130 to the actuator arm 140. The circuit portion 160 is connected to the head 142.

The cover frame 120 is intended to protect the hard disks 130, the head 142, and is attached to the upper surface 112 of the base 110 by screws 180. Here, a sealing gasket 170 is installed between the cover frame 120 and the base 110, and a motor 185 is installed at the base 110. The hard disks 130 are rotatably installed on the shaft of the motor 185. There are several hard disks 130 in which data is stored to increase the data storage capacity.

The noise damping device for a rotating body is composed of patterns 190 of a plurality of intaglio coaxial circles formed on an inner surface 122 of the cover frame 120 and the upper surface 112 of the base 110 for damping noise. Here, the noise is generated by the air flow within the housing 100 when the hard disks 130 rotate at high speed.

The coaxial circles of the pattern 190, as the patterns 30 and 40 shown in FIG. 3, have a predetermined width a and a depth h and are spaced apart a predetermined distance b from neighboring circles. In addition, the center of the pattern 190 is located on the rotation axis of the hard disks 130. Here, it is preferable that the distance b and the width a are identical, i.e., a=b=0.4 mm, and the depth h is 12 µm.

Now, the operation of a hard disk drive employing a noise damping device for a rotating body according to the present invention is described.

First, when the motor 185 is operated to write data to the hard disks 130 or to read written data from it, the hard disks 130 rotate at a speed of about 4,500 or 5,400 RPM. At this time, air flow is generated within the housing 100 due to the rotation of the hard disks 130.

Figure 1:
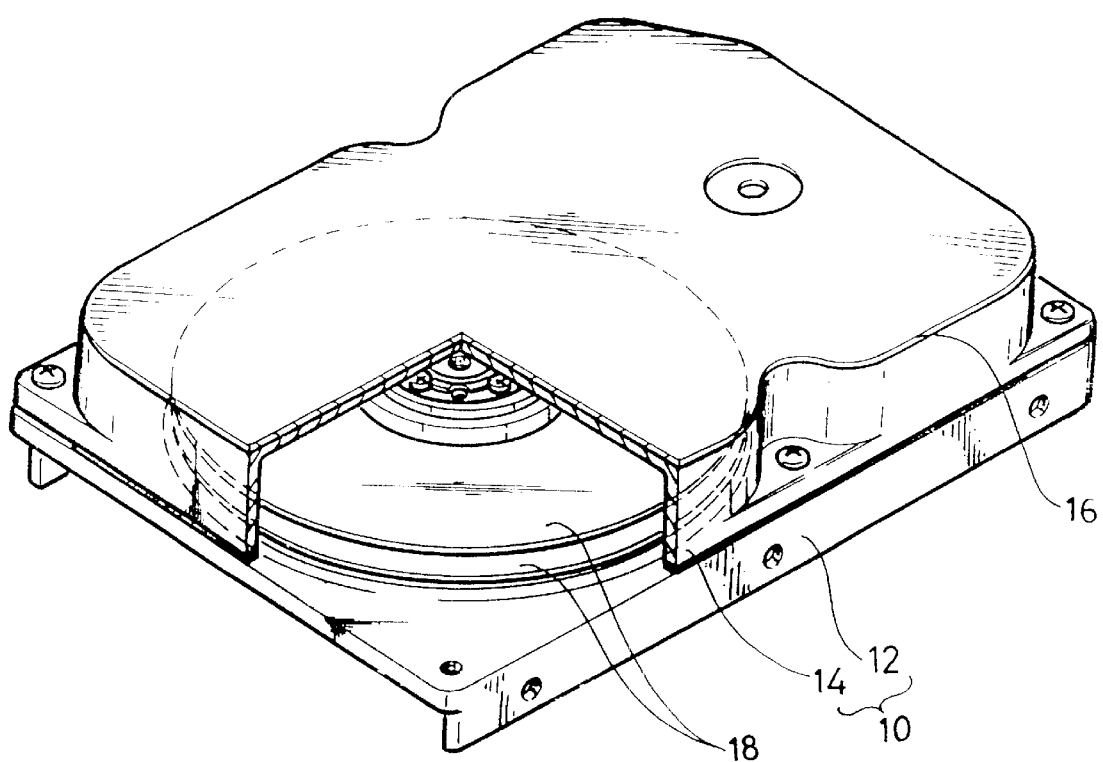
FIG. 1 is a partially cut away perspective view illustrating a hard disk drive to which a conventional noise damping device for a rotating body is applied.
Figure 2:
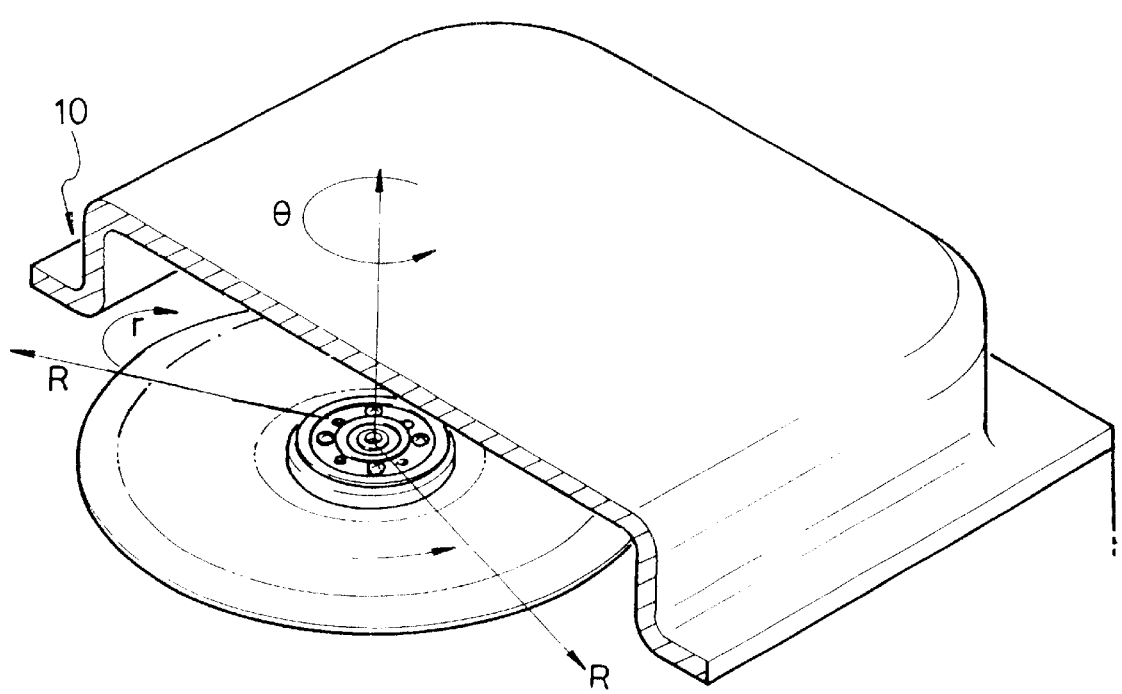
FIG. 2 is a partially cut away perspective view for describing the operation of the hard disk drive shown in FIG. 1.

However, the patterns 190 formed on the cover frame 120 and the base 110 restrain the air flow in the R direction, decelerate the flow speed, reduce the air impact against the cover frame 120, and guide the air flow in the θ direction. Accordingly, noise can be effectively dampened by the patterns 190 without installing a separate member such as the conventional damper member 16 (FIG. 1).

Table 1 shows experimental values of noise generated within the housing 100 when, in the above hard disk drive, the pitch P, width a, distance b, and depth h of the coaxial circular pattern 190 are varied.

TABLE 1

|  | Pattern | | | | Loudness of 1,500 Hz band (sone) | Total sound pressure level (dBA) |
| --- | --- | --- | --- | --- | --- | --- |
|  | P (Pitch) (mm) | a (mm) | b (mm) | h (µm) | | |
| Experimental Example 1 | 1.0 | 0.5 | 0.5 | 18 | 0.22 | 41.3 |
| Experimental Example 2 | 0.8 | 0.4 | 0.4 | 12 | 0.10 | 36.6 |
| Experimental Example 3 | 0.6 | 0.3 | 0.3 | 14 | 0.14 | 37.6 |
| Experimental Example 4 | 0.4 | 0.1 | 0.3 | 12 | 0.20 | 38.4 |
| Comparative Example | 0 | 0 | 0 | 0 | 0.20 | 38.7 |

Referring to Table 1, it was found that the loudness and sound pressure level of noise generated when the width a and distance b of the pattern were the same were generally lower than those generated when the width a and distance b of the pattern were different from each other. In addition, when the width a and distance b of the pattern were the same, and the depth h of the pattern was 12 µm, the loudness and sound pressure level of noise were lowest. That is, when the depth h of the coaxial circular pattern was deeper than an appropriate value, the pattern cannot properly restrain the air flow, rather the air flow became irregular to apply irregular impact which generated more vibrations on the cover frame 120, and the noise level increased undesirably. On the other hand, when the depth h of the coaxial circular pattern was shallower than an appropriate value, the pattern did not effectively control the air flow.

In addition, when the pitch P was too large or small, the air flow could not be effectively controlled. Therefore, it is preferable that the width a and distance b of the coaxial circular pattern be identical, i.e., a=b=0.4 mm, and the depth h of the pattern is 12 µm. In this case, the noise level can be effectively damped from 38.7 dBA in the total sound pressure level when the pattern is not formed to 36.6 dBA. In addition, it was found that noise in the 1,500 Hz band corresponding to the air flow speed of 1.2 m/s within the housing 100 was drastically reduced from 0.20 sone, when the pattern is not formed, to 0.10 sone.

Figure 17:
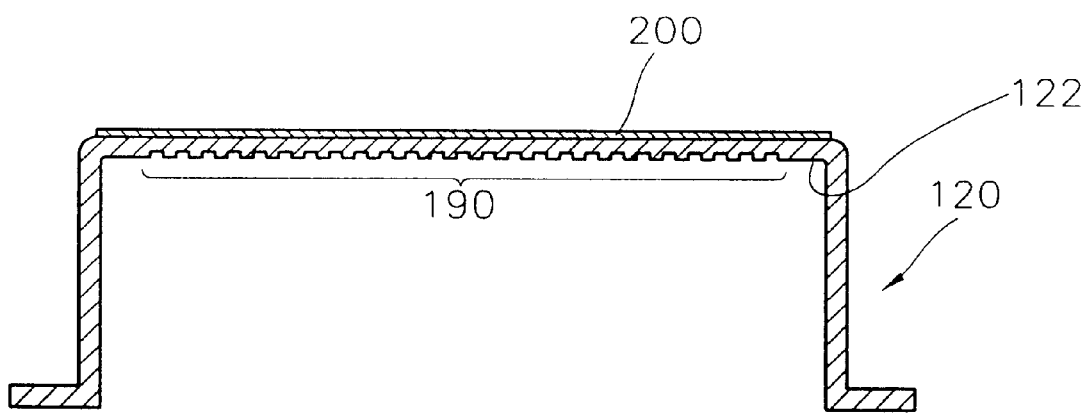
FIG. 17 is a schematic section view illustrating another embodiment of a cover frame shown in FIG. 16.

On the other hand, when it is intended to reduce the noise generated within the housing 100 more effectively, it is possible to further install a damper member 200 for absorbing vibrations on the outer surface of the cover frame 120, as shown in FIG. 17. It is preferable that the damper member 200 is made of generally well-known stainless steel, and the damper member 200 is attached to the cover frame 120 by an adhesive such as a bond or a double-sided bonding tape.

Figure 19:
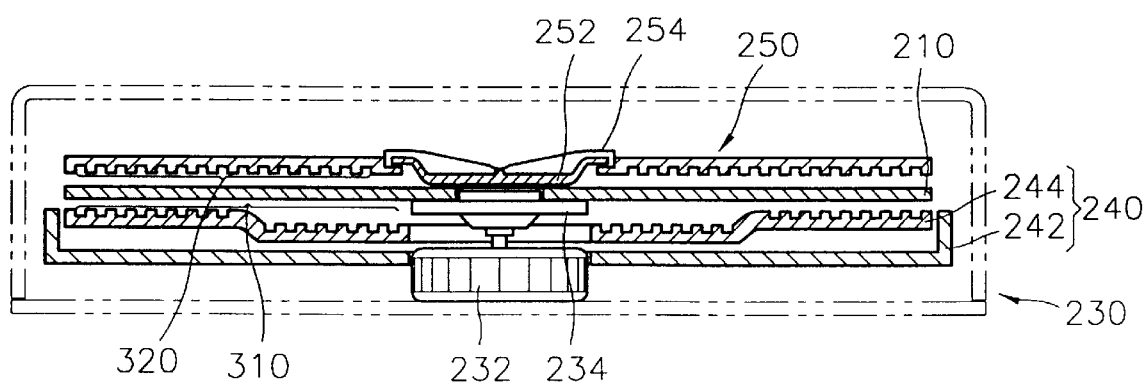
FIG. 19 is a section view illustrating the noise damping device for the disk player shown in FIG. 18.

FIGS. 18 and 19 show a disk player employing a noise damping device according to the present invention. Referring to FIGS. 18 and 19, a disk player includes a housing 230, a disk tray 240 for carrying a disk 210 of a storage medium into the housing 230, a clamping means for clamping the disk moved into the housing 230, and a noise damping device.

A turntable 234 on which the disk 210 is seated, and a motor 232 supporting the turntable 234 and rotating the disk 210 are installed within the housing 230. The turntable 234 and the disk 210 are rotated simultaneously when the motor 232 rotates. Further, an optical pickup which irradiates a light beam on the disk 210 while moving in a radial direction of the disk 210 to store information to the disk 210 or reproduce stored information from it, is installed in the housing 230.

The disk tray 240 includes a tray body 242 and a disk receiving member 244 movably attached to the tray body 242. The tray body 242 is moved into or out of the housing 230 by a predetermined driving means. The disk receiving member 244 is intended to receive the disk 210 and move up and down with respect to the tray body 242. That is, when the disk tray 240 is moved into the housing 230 with the disk 210 received, the disk receiving member 244 is moved so that the disk 210 is seated on the turntable 234.

On the other hand, the tray body 242 and the disk receiving member 244 may be integrally formed. In this case, the disk tray 240 is installed to be movable within the housing 230, or the motor 232 and the turntable 234 are installed to be movable.

The clamping means is intended to clamp the disk 210 moved into the housing 230 and seated on the turntable 234 and to maintain the position and arrangement of the disk 210, and includes a clamping member 250, a holder 252 and an elastic member 254.

The clamping member 250 is movably installed within the housing 230, and has a plate shape. The holder 252, movably supported by the clamping member 250, closely contacts the disk 210 seated on the turntable 234 so that the holder 252 may rotate together with the disk 210 when the disk 210 rotates. The elastic member 254 presses elastically the holder 252 toward the disk 210 and is supported by the clamping member 250 for the holder 252 which remains movably supported by the clamping member 250.

A noise damping device for damping noise generated by the air flow within the housing 230 when the disk 210 rotates is realized by forming predetermined patterns 310 and 320.

Figure 20:
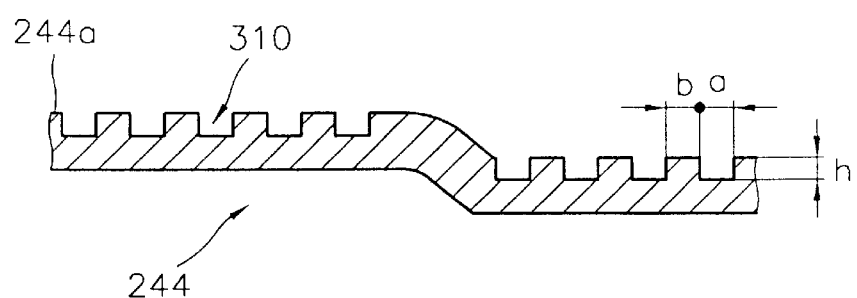
FIG. 20 is a section view taken along line II—II of FIG. 18.
Figure 21:
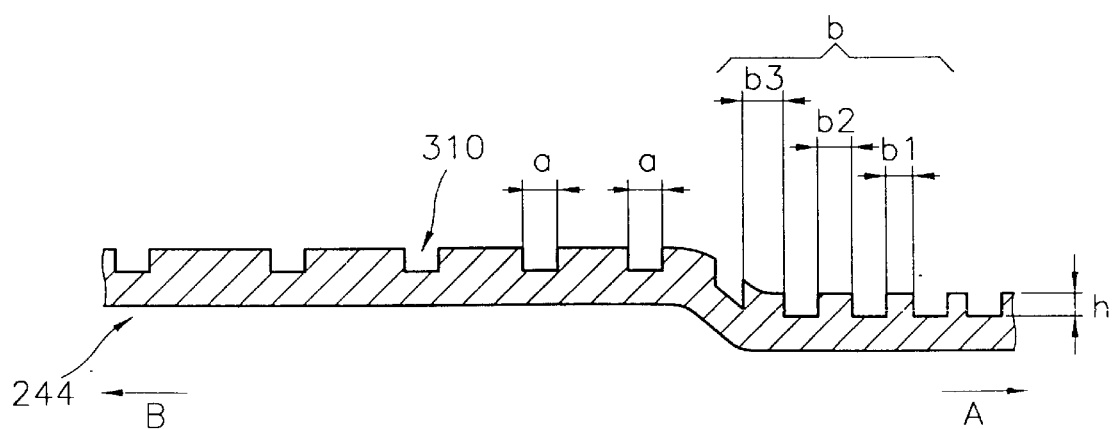
FIG. 21 is a section view illustrating another embodiment of a pattern shown in FIG. 18.

First, in the disk tray 240, a pattern 310 of a plurality of intaglio coaxial circles is formed on the surface 244a of the disk receiving member 244 facing the disk 210. The coaxial circular pattern 310 is formed by taking a point positioned on the rotation axis C' of the disk 210 as a starting point. It is preferable that the coaxial circles of the pattern 310 have the same width a and depth h, as shown in FIG. 20. It is preferable that the coaxial circles of the pattern 310 have a rectangular cross section, and are spaced apart from neighboring circles by a predetermined distance b. Here, it is preferable that the pattern 310 is formed so that the width a and distance b are identical, i.e., a=b so as to effectively control the air flow.

However, the pattern 310 may be formed so that the distances b between neighboring circles are different from each other, i.e., b1<b2<b3. That is, the distances b may be gradually larger from the innermost circle to the outermost circle. In this case, the air flow is gradually controlled from the innermost circle A to the outermost circle B.

Further, the coaxial circular pattern 310 may be a cameo pattern on the surface 244a of the disk receiving member 244, or an intaglio and cameo combined pattern. When the disk tray 240 is made of a plastic material, such a pattern may be formed by extrusion or painting. In addition, when the disk tray 240 is made of a metal, the coaxial circular pattern 310 is formed by laser machining, NC machining, plating, die casting, or etching the disk receiving member 244 made of the metal.

Figure 22:
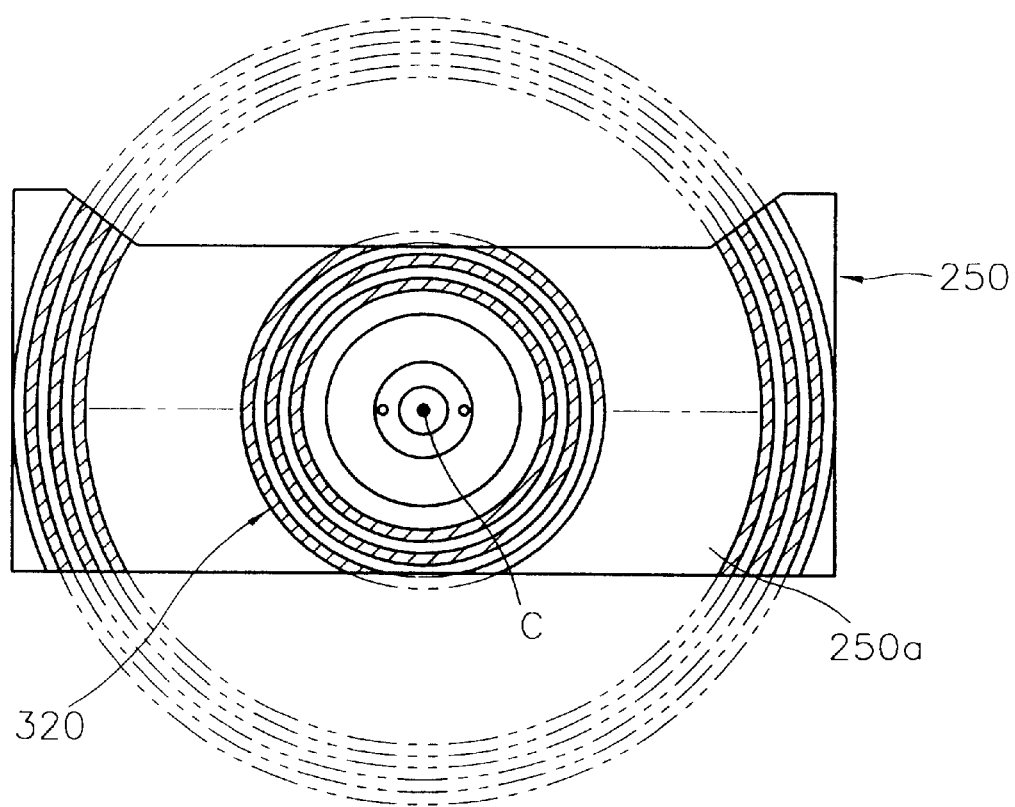
FIG. 22 is a schematic bottom view illustrating a clamping member shown in FIG. 18.

A predetermined intaglio pattern 320 may be formed on the surface 250a of the clamping member 250 facing the disk 210. As shown in FIG. 22, the pattern 320 is composed of a plurality of coaxial circles having a point positioned on the rotation axis of the disk 210 as a starting point C, and has a predetermined depth and width, and the circles are disposed at a predetermined distance from neighboring circles. The structure and processing method of the pattern 320 are the same as the above-described pattern 310.

The patterns 310 and 320 may be formed on any one of the disk tray 240 and the clamping member 250. For example, when the clamping member 250 is integrally formed with the turntable 234, as in a slim disk player, the pattern may be formed on the disk tray 240 and/or the inner surface of the housing 230 facing the disk 210.

In addition, when it is intended to reduce noise due to the rotation of the disk 210 more effectively, it is possible to further install a noise absorbing member 260 within the housing 230, as shown in FIG. 23. The noise absorbing member 260 has a structure capable of absorbing noise, such as a sponge.

Now, the operation of a noise damping device for a disk player according to the present invention will be described with reference to FIGS. 18, 19 and 23.

As shown in FIG. 19, after the disk 210 on the turntable 234 is clamped by the clamping member 250 within the housing 230, the disk 210 is rotated by the motor 232. Thus, as the disk 210 is rotated, the air within the housing 230 is caused to flow.

Meanwhile, the patterns 310 and 320 guide the air flow smoothly, and reduce the flow speed of the air flowing in the θ direction. Accordingly, the impact on the housing 230 is reduced and the noise level is lowered.

In addition, the amount of air flowing from R directions to r direction is reduced. Consequently, the noise due to the irregular air flow caused by mixing of air flowing in r direction and the air flowing in θ direction is reduced.

Although only certain embodiments of the invention have been described with reference to the accompanying drawings for the purposes of illustration, it should be understood that various modifications and equivalents may be made by those skilled in the art without departing from the spirit and scope of the invention.

What is claimed is:

1. A noise damping device for a disk player for damping noise due to the air flow within a housing caused by the rotation of a disk, wherein the device includes a disk tray which is movably installed to carry the disk into or out of the housing and is provided with a cameo and/or intaglio pattern of a predetermined shape formed on the surface of the disk tray facing the disk.

2. The noise damping device for a disk player as claimed in claim 1, wherein the device further includes a clamping member which is installed within the housing for clamping the disk and is provided with a pattern formed on the surface of the clamping member facing the disk, wherein said pattern is at least one pattern selected from the group consisting of an intaglio pattern of a predetermined shape and a cameo pattern of a predetermined shape.

3. The noise damping device for a disk player as claimed in claim 1, wherein the device further includes a noise absorbing member installed within the housing.

* * * * *